United States Patent [19]

Minnis et al.

[11] Patent Number: 4,588,757
[45] Date of Patent: May 13, 1986

[54] AQUEOUS EMULSION LAMINATING ADHESIVE

[75] Inventors: Ralph L. Minnis, Des Plaines; Elias P. Moschovis, Morton Grove; James J. Killeen, Mundelein, all of Ill.

[73] Assignee: DeSoto, Inc., Des Plaines, Ill.

[21] Appl. No.: 700,536

[22] Filed: Feb. 11, 1985

[51] Int. Cl.$^4$ .......................... C08L 63/02; C09D 3/58; C09J 3/14; C09J 3/16
[52] U.S. Cl. ..................................... 523/406; 156/330; 523/409; 524/906
[58] Field of Search ................ 523/406, 409; 524/906; 156/330

[56] References Cited

U.S. PATENT DOCUMENTS

| | | | |
|---|---|---|---|
| 4,308,183 | 12/1981 | Williams | 524/906 |
| 4,418,166 | 11/1983 | Chesney et al. | 524/906 |
| 4,444,923 | 4/1984 | McCarty | 523/409 |
| 4,503,173 | 3/1985 | Martino et al. | 523/409 |

FOREIGN PATENT DOCUMENTS

| | | | |
|---|---|---|---|
| 53-23399 | 3/1978 | Japan | 524/906 |
| 59-145211 | 8/1984 | Japan | 523/409 |
| 2108976 | 5/1983 | United Kingdom | 523/409 |

*Primary Examiner*—Ronald W. Griffin
*Attorney, Agent, or Firm*—Dressler, Goldsmith, Shore, Sutker & Milnamow, Ltd.

[57] ABSTRACT

A method of forming an aqueous emulsion laminating adhesive having an extended pot life is disclosed in which monoethylenically unsaturated monomers are polymerized to form a copolymer having a glass transition temperature in the range of about $-10°$ C. to about $-50°$ C. The polymerization is carried out in aqueous emulsion in the presence of emulsified epoxy resin in an amount of from about 2% to about 60%, based on the weight of the monomers which are copolymerized. An aqueous emulsion of amine-functional resin is then mixed into aqueous emulsion containing copolymer and epoxy resin formed by the aqueous emulsion copolymerization to provide a weight ratio of amino hydrogen atoms to oxirane groups of from about 0.1 to about 1.0.

16 Claims, No Drawings

AQUEOUS EMULSION LAMINATING ADHESIVE

DESCRIPTION

1. Technical Field

This invention relates to aqueous emulsion laminating adhesives which include copolymers of monoethylenically unsaturated monomers and epoxy resins as components of one package and an amine-functional curing agent as a component of another package.

2. Background Art

Epoxy resins are reactive resins which have been cured with amine-functional resins, but these are usually employed in organic solvent solution. The solvent is expensive and is usually flammable, so it is desired to employ aqueous systems which eliminate or minimize the organic solvent component.

It is also known to employ epoxy resins and amine-functional resins in aqueous emulsion, but these require an acrylic or vinyl polymer to flexibilize the cured coatings. However, these known aqueous systems involve the use of three components, and it is necessary to premix the epoxy emulsion with the polymer emulsion and to age this premixture before the amine-functional curing emulsion can be added. Without aging, the mixture forms a cloudy film between the transparent films that are laminated with the adhesive and produces a poor appearance. Moreover, the final mixture has a very limited pot life, frequently of about 1 hour, and this is too short for commercial use. As a result, the final emulsion will sometimes gel on the machine used to apply the mixture to the plastic substrates being laminated.

DISCLOSURE OF INVENTION

In accordance with this invention, aqueous emulsion laminating adhesives are formed by polymerizing monoethylenically unsaturated monomers to form a low glass transition temperature copolymer (as later more fully set forth) in an aqueous emulsion in the presence of an emulsified epoxy resin. When an amine-functional resin in aqueous emulsion is mixed in with the aqueous emulsion of copolymer and epoxy resin so-formed, the pot life is found to be greatly extended, and the adhesives are clear.

More particularly, the method of forming an aqueous emulsion adhesive comprises polymerizing monoethylenically unsaturated monomers in aqueous emulsion in the presence of an emulsified epoxy resin to form an aqueous emulsion copolymer. The copolymer of the monoethylenically unsaturated monomers has a glass transition temperature in the range of about −10° C. to about −50° C. and the epoxy resin is present in an amount of from about 2% to about 60%, based on the weight of the monomers which are copolymerized. The aqueous emulsion of copolymer and epoxy resin formed by this copolymerization is mixed with an aqueous emulsion of amine-functional resin in an amount to supply a weight ratio of amino hydrogen atoms to oxirane groups of from about 0.1 to about 1.0 to form an adhesive composition.

These adhesives are typically used by coating them upon at least one of the plastic substrates which which are to be laminated and then drying the applied coating to form a solid adhesive film. The plastic substrates are then assembled and subjected to pressure with the adhesive film in between to cause the substrates to adhere. The dried adhesive film between the plastic substrates cures with time to provide a permanent bond.

The epoxy resins which are used in this invention include any polyepoxide which can be stably emulsified in water, but is preferably a relatively low molecular weight diglycidyl ether of a bisphenol. By low molecular weight is meant a molecular weight in the range of about 350 to about 3,000. The diglycidyl ether is preferably a liquid at room temperature, such as a diglycidyl ether of bisphenol A which is available in commerce from Shell Chemical Company under the trade designation Epon 828. This commercial product will be used herein as illustrative. Molecular weights for polyepoxides are normally calculated from the known structure based on the measured functionality, such as the epoxide and/or the hydroxy equivalent weight.

The polyepoxides are emulsified in water using nonionic surfactants, as is known, although the emulsifying agent (surfactant) is of secondary significance. These nonionic surfactants are usually ethylene oxide adducts of octyl or nonyl phenols or long chain alcohols, like docecanol, containing from 5–80 moles, preferably from 8–40 moles, of ethylene oxide per mole of the phenol or alcohol.

It is desired to point out that the monoethylenically unsaturated monomers may be emulsified separately from the polyepoxide, or the two can be mixed together and then emulsified, or one can be added to an emulsion of the other at any time with agitation to form the emulsion as needed, and all of these procedural variation are intended to be embraced herein.

The monoethylenically unsaturated monomers which may be copolymerized in aqueous emulsion are subject to considerable variation so long as they provide a polymer having the desired glass transition temperature. Thus, one may use ethyl acrylate, butyl acrylate or methacrylate, 2-ethylhexyl acrylate, vinyl acetate, and the like, in any admixture of monomers providing a glass transition temperature of from about −10° C. to about −50° C., preferably from −15° C. to −30° C. Optionally, but preferably, one will include from 1% to 5% of an acid monomer, like acrylic or methacrylic acid, and from 1% to 5% of an hydroxyalkyl monomer in which the alkyl group contains from 2–4 carbon atoms, like 2-hydroxyethyl acrylate or 2-hydroxypropyl acrylate, but the inclusion of such components is not essential. A preferred monomer mixture will be illustrated in the Example which follows.

The emulsion copolymerization is not unusual, except for the presence of the epoxy emulsion. The monomers will normally be present in the aqueous polymerization medium in a proportion of from about 25% to about 55%, and they will be emulsified using a nonionic surfactant, such as those previously described, either alone or together with an anionic surfactant, like sodium lauryl sulfate or sodium succinates. The polymerization is carried out below the boiling point of water using a free radical generating catalyst as is common in emulsion polymerization. One can use a conventional redox system to provide the catalyst, or simply employ a persulfate, like ammonium persulfate.

In preferred practice, the catalyst is ammonium persulfate, no reducing agent is present, and the polymerization is carried out at about 80° C.

The proportion of epoxy resin which is present when the monoethylenically unsaturated monomers are copolymerized can vary considerably from about 2% to about 60%, preferably 3% to 40%, based on the weight of the monomers which are copolymerized. Best present practice includes from about 15% to about 25% epoxy resin, on the stated basis.

Any amine-functional resin which can be provided in aqueous emulsion can be used to cure the blend of copolymer and epoxy emulsions which is formed. These are usually amine-functional resins of relatively low molecular weight, such as the dimer fatty acid diamines which contain about 36 carbon atoms. Amine-functional polyesters and solution copolymers containing primary and secondary amines, like allyl amine, aminoethyl methacrylate, monopropyl aminopropyl methacrylate, and the like, are also useful. These copolymers will desirably contain from about 5% to about 50% of copolymerized amine monomer together with any monoethylenically unsaturated monomer copolymerizable therewith, such as a copolymer of 80% ethyl acrylate with 20% monopropyl aminopropyl methacrylate.

These amine-functional resins are emulsified in water for use in this invention, usually to provide an emulsion containing from about 5% to about 25% of amine resin, preferably from 8% to 20%, and most preferably from 10% to 18%. While various surfactants can be used for emulsifying the amine-functional resin, including cationic surfactants, it is preferred herein to use a nonionic surfactant, which may be the same nonionic surfactant used to emulsify the epoxy resin and the monoethylenically unsaturated monomers.

The emulsion copolymerization of monoethylenically unsaturated monomers, and the emulsions of amine-functional resins are all well known to those skilled in the art of polymerization processes. This invention, however, relates to the inexplicable improvement in pot life which is obtained when the monoethylenically unsaturated monomers are copolymerized in aqueous emulsion containing the emulsified epoxy resin.

Also, one can add the epoxy resin emulsion to the polymerization medium or emulsify the epoxy resin and the monomers in the water and surfactants used for polymerization. However, it is presently preferred to emulsify the epoxy resin and then add this emulsion to the monomers together with more water and more emulsifying agent to form a blend of emulsions which is supplied to the polymerization reactor.

The proportion of amine-functional resin which is used for cure is also subject to wide variation. The equivalent ratio of amine hydrogen to oxirane functionalities may range from about 0.1 to about 1.0, but is preferably in the range of 0.25 to 0.6.

The invention is illustrated in the Example which follows, it being understood that throughout this application and in the claims which follow, all proportions and ratios are by weight, unless otherwise stated.

EXAMPLE 690 grams of deionized water are charged to a 5 liter 4-necked flask and heated to 80° C. at which time 4.5 grams of ammonium persulfate are added. Then, a preemulsion mixture is separately formed to contain 510 grams of deionized water, 45 grams of anionic surfactant which is a mixture of disodium sulfosuccinates containing an equiweight mixture of Aerosols A-102, A-103 and A-268 supplied by American Cyanamid Co., Wayne, N.J. (American Cyanamid Co. product Aerosol 501 may be used in place of this mixture) and 562 grams of an epoxy emulsion containing 53.5% water, 44.5% epoxy (Epon 828 from the Shell Chemical Co., Houston Tex., may be used) and 2.0% nonionic surfactant (Triton X405 from Rohm & Haas Co., Philadelphia, Pa., may be used), 750 grams of 2-ethylhexyl acrylate, 660 grams of ethyl acrylate, 45 grams of methacrylic acid and 45 grams of 2-hydroxyethyl acrylate. This emulsion premix is slowly added to the hot water and persulfate in the flask with agitation while maintaining 80°-85° C. over a two hour period. The resulting mixture is held at the same temperature for an additional two hours. A solution of 0.75 gram ammonium persulfate in 18 grams of water is added and the mixture is maintained at the same temperature for one hour. Another 0.75 gram of ammonium persulfate in 18 grams of water is added and the mixture is maintained at the same temperature for two more hours to complete the polymerization of the monomers in the presence of the epoxy resin emulsion. Deionized water is then added as the mixture is cooled to room temperature to provide a final product which is a blend of emulsions having a solids content of about 50.0%, a viscosity of 30–50 centipoises, and a pH of about 4.4.

In view of the absence of peroxy catalysts and the low polymerization temperature, little if any grafting is expected.

A polyamide emulsion for curing the epoxycopolymer emulsion blend provided previously is made by charging 3968 grams of amine-functional resin (Versamid 140 from General Mills, Inc., Minneapolis Minn., may be used) to a mixing chamber where it is heated to about 80° C. and agitated under high shear as 178 grams of the same nonionic surfactant described previously in admixture with 22,500 grams of deionized water are slowly added. The temperature is maintained at about 30° C. as mixing proceeds.

100 parts of the acrylic emulsion described above and which contains epoxy resin is mixed with 225 parts of the polyamide emulsion to provide a relatively stable mixture having a pot life of about one week. This mixture contains about 3 equivalents of oxirane functionality per equivalent of amino hydrogen functionality.

The freshly prepared mixture is applied using a gravure roller to one surface of a Mylar film in a thickness providing about 2.0 pound of coating per ream of film (3300 square feet). The coating is dried in an oven at 170° F. and polypropylene is pressed against the dried adhesive film on the Mylar support using a laminating pressure of about 40 psi. The two films are well bonded, and adhesive cures slowly with time to form a permanent bond. The cured film is clear to provide an attractive appearance.

What is claimed is:

1. A method of forming an aqueous emulsion adhesive comprising polymerizing monoethylenically unsaturated monomers in aqueous emulsion in the presence of an emulsified epoxy resin to form an aqueous emulsion copolymer, the copolymer of said monoethylenically unsaturated monomers having a glass transition temperature in the range of about −10° C. to about −50° C. and said epoxy resin being present in an amount of from about 2% to about 60%, based on the weight of the monomers which are copolymerized, and then mixing the aqueous emulsion of copolymer and epoxy resin formed by said copolymerization with an aqueous emulsion of amine-functional resin in an amount to supply a weight ratio of amino hydrogen atoms to oxirane groups of from about 0.1 to about 1.0.

2. A method as recited in claim 1 in which said epoxy resin is a diglycidyl ether of a bisphenol having a molecular weight in the range of about 350 to about 3,000, and is emulsified in water with the aid of a nonionic surfactant.

3. A method as recited in claim 2 in which said epoxy resin is a diglycidyl ether of bisphenol A which is liquid at room temperature and which is present in an amount of from 3% to 40% based on the weight of the monomers which are copolymerized.

4. A method as recited in claim 2 in which said mixture of monoethylenically unsaturated monomers provides a copolymer having a glass transition temperature of from −15° C. to −30° C.

5. A method as recited in claim 4 in which said mixture of monomers includes from 1% to 5% of acrylic or methacrylic acid.

6. A method as recited in claim 5 in which said mixture of monomers includes from 1% to 5% of an hydroxyalkyl monomer in which the alkyl group contains from 2–4 carbon atoms.

7. A method as recited in claim 6 in which said hydroxyalkyl monomer is 2-hydroxyethyl acrylate.

8. A method as recited in claim 1 in which said monomers are emulsified in the aqueous polymerization medium in a proportion of from 25% to 55% using a nonionic surfactant together with an anionic surfactant, and the polymerization is carried out below the boiling point of water using a persulfate.

9. A method as recited in claim 8 in which the catalyst is ammonium persulfate, no reducing agent is present, and the polymerization is carried out at about 80° C.

10. A method as recited in claim 1 in which said amine-functional resin is emulsified in water with a nonionic surfactant to provide an emulsion containing from 8% to 20% of amine-functional resin.

11. A method as recited in claim 10 in which said amine-functional resin is a dimer fatty acid diamine.

12. A method as recited in claim 10 in which said amine-functional resin is present in a weight ratio of amino hydrogen atoms to oxirane groups of from 0.25 to 0.6.

13. A method of forming an aqueous emulsion adhesive comprising polymerizing monoethylenically unsaturated monomers including from 1% to 5% of acrylic or methacrylic acid and from 1% to 5% of an hydroxyalkyl monomer in which the alkyl group contains from 2–4 carbon atoms in aqueous emulsion in the presence of an emulsified epoxy resin which is a diglycidyl ether of a bisphenol having a molecular weight in the range of about 350 to about 3,000 to form an aqueous emulsion copolymer, the copolymer of said monoethylenically unsaturated monomers having a glass transition temperature in the range of −15° C. to −30° C. and said epoxy resin being present in an amount of from 3% to 40%, based on the weight of the monomers which are copolymerized, and then mixing the aqueous emulsion of copolymer and epoxy resin formed by said copolymerization with an aqueous emulsion of dimer fatty acid diamine in an amount to supply a weight ratio of amino hydrogen atoms to oxirane groups of from 0.25 to 0.6.

14. A method as recited in claim 13 in which said monomers are emulsified in the aqueous polymerization medium in a proportion of from 25% to 55% using a nonionic surfactant together with an anionic surfactant, and the polymerization is carried out at about 80° C. in the presence of ammonium persulfate.

15. The product of the method of claim 1.

16. The product of the method of claim 13.

* * * * *